United States Patent
Asoma

(10) Patent No.: US 7,535,813 B2
(45) Date of Patent: May 19, 2009

(54) OPTICAL PICKUP AND DISC DRIVE APPARATUS

(75) Inventor: Yoshito Asoma, Saitama (JP)

(73) Assignee: Sony Corporation, Tokyo (JP)

( * ) Notice: Subject to any disclaimer, the term of this patent is extended or adjusted under 35 U.S.C. 154(b) by 295 days.

(21) Appl. No.: 10/590,960

(22) PCT Filed: Mar. 3, 2005

(86) PCT No.: PCT/JP2005/004162

§ 371 (c)(1),
(2), (4) Date: Aug. 29, 2006

(87) PCT Pub. No.: WO2005/088626

PCT Pub. Date: Sep. 22, 2005

(65) Prior Publication Data

US 2007/0177480 A1    Aug. 2, 2007

(30) Foreign Application Priority Data

Mar. 15, 2004   (JP)   .............................. 2004-072718

(51) Int. Cl.
*G11B 7/00*   (2006.01)

(52) U.S. Cl. ................................. 369/112.01

(58) Field of Classification Search ............ 369/112.01, 369/112.1, 44.23, 44.24, 44.37, 112.02
See application file for complete search history.

(56) References Cited

U.S. PATENT DOCUMENTS 5,835,466 A * 11/1998 Shimoda ................... 369/44.29
7,075,879 B2 * 7/2006 Kim ....................... 369/112.03

FOREIGN PATENT DOCUMENTS

| JP | 5 242514 | 9/1993 |
| JP | 9 147379 | 6/1997 |
| JP | 10 222865 081998 | 8/1998 |
| JP | 2001 209966 | 8/2001 |
| JP | 2001 222839 | 8/2001 |
| JP | 2003 288733 | 10/2003 |

* cited by examiner

*Primary Examiner*—Nabil Z Hindi
(74) *Attorney, Agent, or Firm*—Oblon, Spivak, McClelland, Maier & Neustadt, P.C.

(57) ABSTRACT

A plurality of light-emitting elements 9a, 9b, 10a each emitting laser beam of a wavelength of approximately 405 nm, approximately 660 nm or approximately 780 nm corresponded to each of a plurality of types of disc-formed medium 100, and an objective lens 18 condensing each laser beam emitted from the plurality of light-emitting elements so as to form an elliptic beam spot on a recording surface of the disc-formed recording medium are provided, wherein a long axis of a beam spot of the laser beam having a wavelength of approximately 660 nm is aligned in a direction 45° to 65° away from the tangential direction of the disc-formed recording medium, and a long axis of a beam spot of the laser beam having a wavelength of approximately 405 nm is aligned in a direction 25° to 45° away from the tangential direction of the disc-formed recording medium. With this configuration, it is made possible to improve performance of reading information signals with respect to different types of disc-formed recording media without increasing the cost.

6 Claims, 7 Drawing Sheets

OPTICAL PICKUP AND DISC DRIVE APPARATUS

TECHNICAL FIELD

The present invention relates to technical fields relevant to an optical pickup and a disc drive apparatuses. In more detail, the present invention relates to a technical field aimed at improving performance of reading information signals in an optical pickup and a disc drive apparatus compatible with different types of disc-formed recording media.

BACKGROUND ART

There is known a disc drive apparatus which records and reproduces information signals to or from disc-formed recording media, and such disc drive apparatus is equipped with an optical pickup which records and reproduces information signals by irradiating a laser beam onto a disc-formed recording medium through an objective lens.

In recent years, various types of disc-formed recording media differed in recording density and thickness of the cover have been developed, and known examples of such disc-formed recording media include CD (compact disc) based on an operation wavelength of laser beam of 780 nm or around, DVD (digital versatile disc) based on an operation wavelength of 660 nm or around, Blu-ray disc (BD) based on an operation wavelength of 405 nm or around, and AOD (advanced optical disc) based on an operation wavelength of again 405 nm or around. There is also known HD-DVD (high definition DVD) as a standard nearly conforming to the AOD standard, so that AOD in the description below will be understood as including HD-DVD.

As a disc drive apparatus which records and reproduces information signals to or from a plurality of types of disc-formed media differed in the operation wavelength of laser beam, there has been known the one equipped with a plurality of objective lenses corresponded to the individual disc-formed recording media (for example, Japanese Patent Application Publication "KOKAI" No. 2001-110086).

The disc drive apparatus described in Japanese Patent Application Publication "KOKAI" No. 2001-110086 has provided therein a biaxial actuator having a plurality of objective lenses corresponded, for example, to a disc-formed recording medium using a laser beam of approximately 405 nm, and to a disc-formed recording medium using a laser beam of approximately 660 nm, wherein laser beam of approximately 405 nm is condensed by one objective lens onto the recording surface of one disc-formed recording medium, and a laser beam of approximately 660 nm is condensed by the other objective lens onto the recording surface of the other disc-formed recording medium, so as to record and reproduce information signals to and from the individual disc-formed recording media.

DISCLOSURE OF THE INVENTION

Use of a plurality of objective lenses for recording and reproducing information signals to or from a plurality of types of disc-formed recording media, just like the conventional optical pickup as described in the above, however, needs a correspondingly large number of components, and results in increase in size of the disc drive apparatus or increase in costs for manufacturing.

Provision of a plurality of objective lenses also increases weight of a moving mechanism of the biaxial actuator, and consequently worsens response of the moving mechanism during focusing control and tracking control.

One possible way of dissolving these nonconformities may be such as using a single objective lens for recording and reproducing information signals to or from above-described three types of disc-formed media differed in wavelength.

By the way, information signals are read out generally by forming an elliptic beam spot on a recording track of the disc-formed recording medium, wherein orientation of the beam spot with respect to the recording track largely affects performance of reading of information signals. In such a case of using a single objective lens for recording and reproducing information signals to and from three types of disc-formed recording media as described in the above, the same way of use thereof for the laser beams differed in wavelength of approximately 405 nm, approximately 660 nm and approximately 780 nm results in a constant orientation of the beam spot, fails in ensuring desirable beam profiles for all of three types of disc-formed recording media, and consequently fails in obtaining desired characteristics.

One possible way of ensuring desired characteristics for all of three types of disc-formed recording media may be such as using an anamorphic prism so as to shape the beam profile of the laser beam into a circle, but expensiveness of the anamorphic prism results in increase in costs for manufacturing of the optical pickup and of the disc drive apparatus.

Therefore, a subject of the optical pickup and the disc drive apparatus of the present invention is to overcome the above-described problems, and to improve performance of reading of information signals from disc-formed recording media differed in type, without causing increase in the cost.

In order to solve the above-described problems, each of the optical pickup and the disc drive apparatus of the present invention has a moving base which moves itself in the direction of radius of a disc-formed recording medium set on a disc table; an objective lens driver disposed on the moving base; a plurality of light-emitting elements differed in type, each of which emits, towards a plurality of disc-formed recording media differed in type, laser beam of a wavelength of approximately 405 nm, approximately 660 nm or approximately 780 nm corresponded to each of the disc-formed media; an objective lens which condenses each laser beam onto a recording surface of the disc-formed recording medium; and a light-receiving element which receives the laser beam emitted from the light-emitting elements, which is configured so that the objective lens condenses the laser beam onto the recording surface of the disc-formed recording medium to thereby form an elliptic beam spot; so that a long axis of a beam spot of the laser beam having a wavelength of approximately 660 nm is aligned in a direction 45° to 65° away from a tangential direction of the disc-formed recording medium; and so that a long axis of a beam spot of the laser beam having a wavelength of approximately 405 nm is aligned in a direction 25° to 45° away from the tangential direction of the disc-formed recording medium.

Accordingly in the optical pickup and the disc drive apparatus of the present invention, orientation of the beam spot formed on the recording surface of the disc-formed recording medium can be optimized respectively for the laser beams of three wavelengths differed from each other.

BEST MODES FOR CARRYING OUT THE INVENTION

Best modes of an optical pickup and a disc drive apparatus of the present invention will be described below, referring to the attached drawings.

Figure 1:
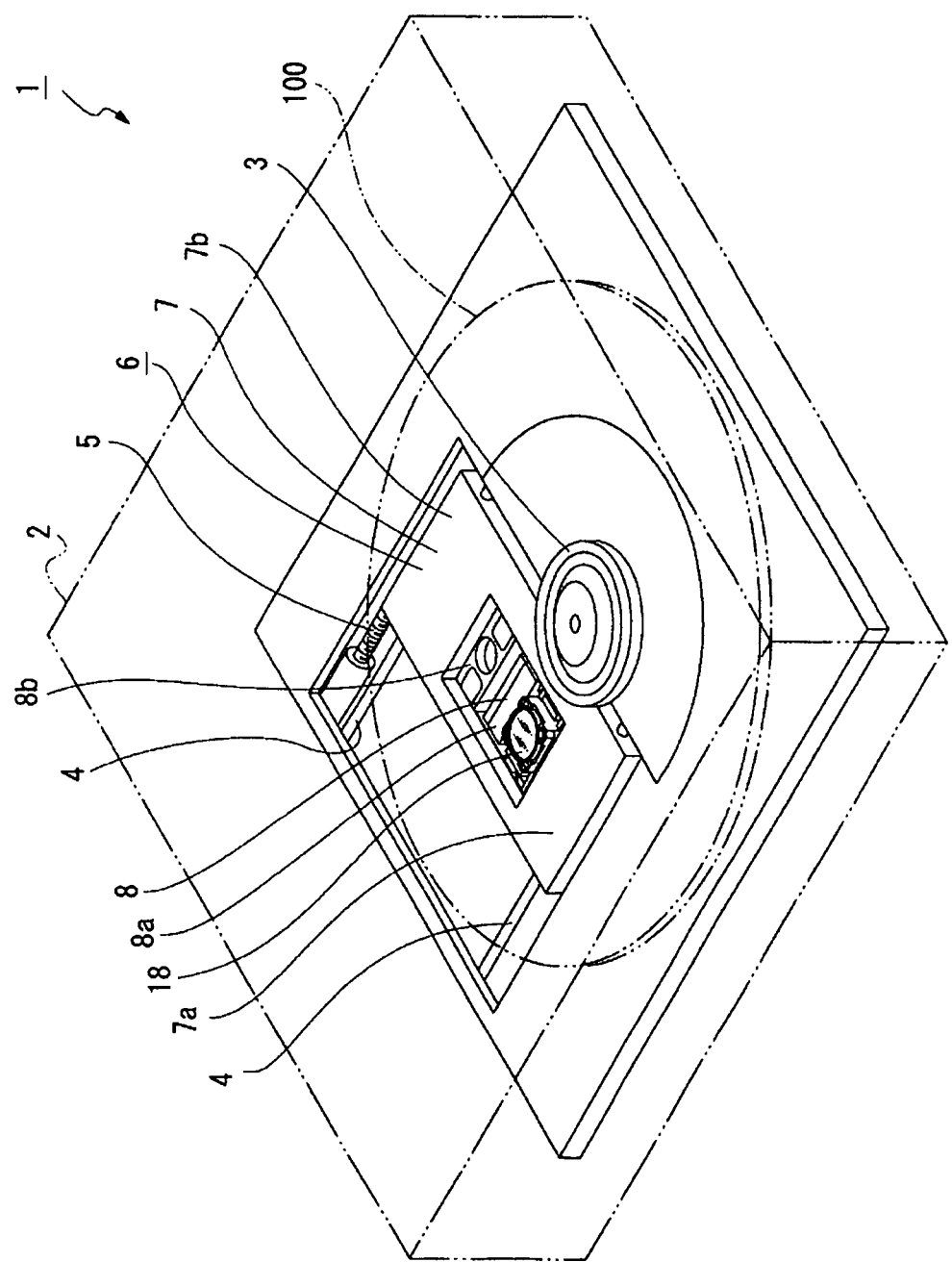
FIG. 1 shows best modes of carrying out the present invention, together with FIG. 2 to FIG. 10, and this drawing is a schematic perspective view of a disc drive apparatus.

A disc drive apparatus 1 has a housing 2 having necessary components and mechanisms disposed therein (see FIG. 1), and the housing 2 has a non-illustrated disc insertion slot formed thereon.

The housing 2 has a non-illustrated chassis disposed therein, and a disc table 3 is fixed on the motor axis of a spindle motor attached to the chassis.

The chassis has parallel guide axes 4, 4 attached thereto, and has, supported thereon, a lead screw 5 rotated by a non-illustrated feed motor.

An optical pickup 6 has a moving base 7, necessary optical components provided on the moving base 7, and an objective lens driver 8 disposed on the moving base 7, wherein bearing portions 7a, 7b provided on both ends of the moving base 7 are supported by the guide axes 4, 4, respectively, in a freely slidable manner. The objective lens driver 8 has a moving portion 8a and a fixed portion 8b, wherein the moving portion 8a is supported via a non-illustrated suspension by the fixed portion 8b in a freely movable manner. A non-illustrated nut member provided to the moving base 7 is engaged with the lead screw 5, so that rotation of the lead screw 5 with the aid of the feed motor feeds the nut member to a direction corresponded to the direction of rotation of the lead screw 5, and thereby the optical pickup 6 is moved in a radial direction of a disc-formed recording medium 100 set on the disc table 3.

The disc-formed recording medium 100 used herein may be DVD (digital versatile disc) 100a and CD (compact disc) 100b, for example, and additionally Blu-ray disc (BD) 100c or AOD (advanced optical disc) 100d. Operation wavelength of laser beam for each of these disc-formed recording media 100 is approximately 660 nm for the DVD 100a, approximately 780 nm for the CD 100b, and approximately 405 nm for the BD 100c and the AOD 100d.

The thickness of a cover of each of the disc-formed recording media 100 is 0.6 mm for the DVD 100a, 1.2 mm for the CD 100b, 0.1 mm for the BD 100c, and 0.6 mm for the AOD 100d, and a numerical aperture of the later-described objective lens provided to the objective lens driver 8 is preferably adjusted to 0.65 or around for the DVD 100a, CD 100b and AOD 100d, and 0.85 or around for the BD 100c, taking the operation wavelength of each of the disc-formed recording media 100 and the thickness of the cover into consideration.

The track pitch of each of the disc-formed recording media 100 is 0.74 μm for the DVD 100a, 1.6 μm for the CD 100b, 0.32 μm for the BD 100c, and 0.34 μm for the AOD 100d.

In thus-configured disc drive apparatus 1, when the disc table 3 is rotated as the spindle motor rotates, the disc-formed recording medium 100, that is, the DVD 100a or the CD 100b set on the disc table 3 is rotated, and at the same time, the optical pickup 6 is allowed to move in the direction of radius of the disc-formed recording medium 100 to thereby cause recording operation or reproducing operation to or from the disc-formed recording medium 100. In this process, the moving portion 8a of the objective lens driver 8 is moved relative to the fixed portion 8b, so as to effect focusing adjustment and tracking adjustment of the later-described objective lens provided to the moving portion 8a.

Figure 2:
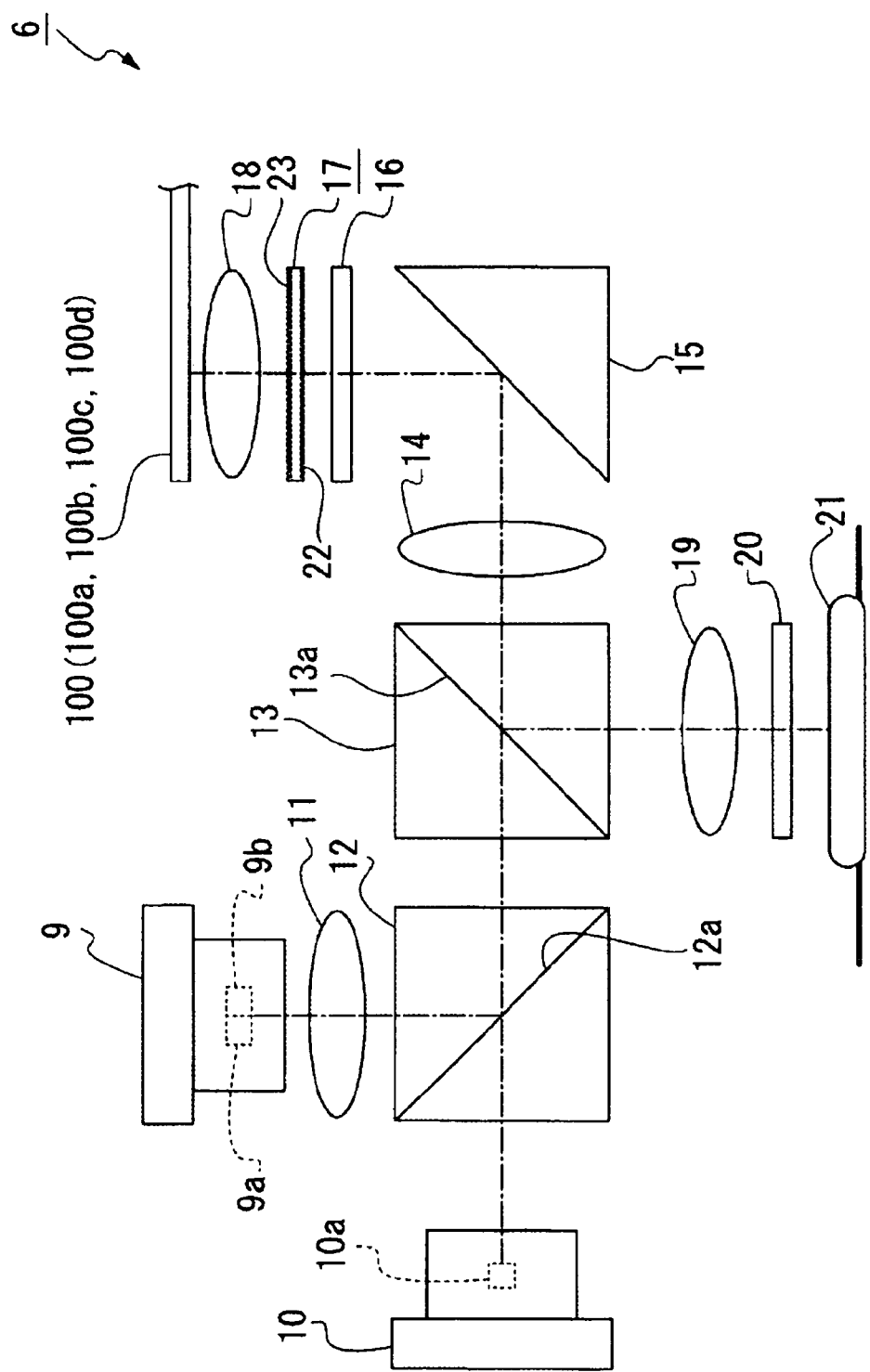
FIG. 2 is a conceptual drawing showing a configuration of an optical pickup.

The optical pickup 6 typically has, as shown in FIG. 2, a first light source 9, a second light source 10, a coupling lens 11, an optical path synthesizing element 12, a beam splitter 13, a collimator lens 14, a rise-up mirror 15, a quarter wavelength plate 16, a diffraction element 17, an objective lens 18, a conversion lens 19, an optical axis synthesizing element 20 and a light-receiving element 21, wherein components other than the objective lens 18 are disposed on the moving base 7, and the objective lens 18 is provided to the moving portion 8a of the objective lens driver 8.

The first light source 9 has a first light-emitting element 9a and a second light-emitting element 9b provided therein, wherein a laser beam of approximately 660 nm corresponded to the DVD 100a is emitted from the first light-emitting element 9a, and a laser beam of approximately 780 nm corresponded to the CD 100b is emitted from the second light-emitting element 9b.

The emission surfaces of the first light-emitting element 9a and the second light-emitting element 9b are disposed so as to incline a long axis of the laser beam emitted therefrom 45° to 65° away from the recording surface of the disc-formed recording medium 100.

The second light source 10 has a third light-emitting element 10a provided therein, wherein a laser beam of approximately 405 nm corresponded to the BD 100c or the AOD 100d is emitted from the third light-emitting element 10a.

The emission surface of the third light-emitting element 10a is disposed so as to incline a long axis of the laser beam emitted therefrom 25° to 45° away from the recording surface of the disc-formed recording medium.

The coupling lens 11 has a function of converting optical magnification of the laser beam emitted from the first light source 9 on the forward path.

The optical path synthesizing element 12 is typically a beam splitter having a mirror surface 12a with a wavelength selectivity. The laser beam having a wavelength of approximately 660 nm or approximately 780 nm emitted from the first light-emitting element 9a or the second light-emitting element 9b is allowed to independently reflect on the mirror surface 12a, and the laser beam having a wavelength of approximately 405 nm emitted from the third light-emitting element 10a of the second light source 10 is allowed to transmit through the mirror surface 12a.

The beam splitter 13 has a function of allowing the incident laser beam to transmit therethrough or to reflect thereon depending on difference in the direction of polarization, wherein the laser beam on the forward path is allowed to transmit through the splitting surface 13a and is directed to the collimator lens 14, and the laser beam on the return path is allowed to reflect on the splitting surface 13a and is directed to the light-receiving element 21.

The collimator lens 14 has a function of converting flux of the incident laser beam into parallel flux.

The rise-up mirror 15 has a function of reflecting the incident laser beam at an angle of approximately 90°.

The quarter wavelength plate 16 has a function of conversion between linear polarization and circular polarization of light.

The diffraction element 17 has a first diffraction section 22 and a second diffraction section 23 respectively formed on both surfaces thereof, for an exemplary case where the BD 100c is used as the disc-formed recording medium 100 corresponded to a laser beam of approximately 405 nm.

Figure 3:
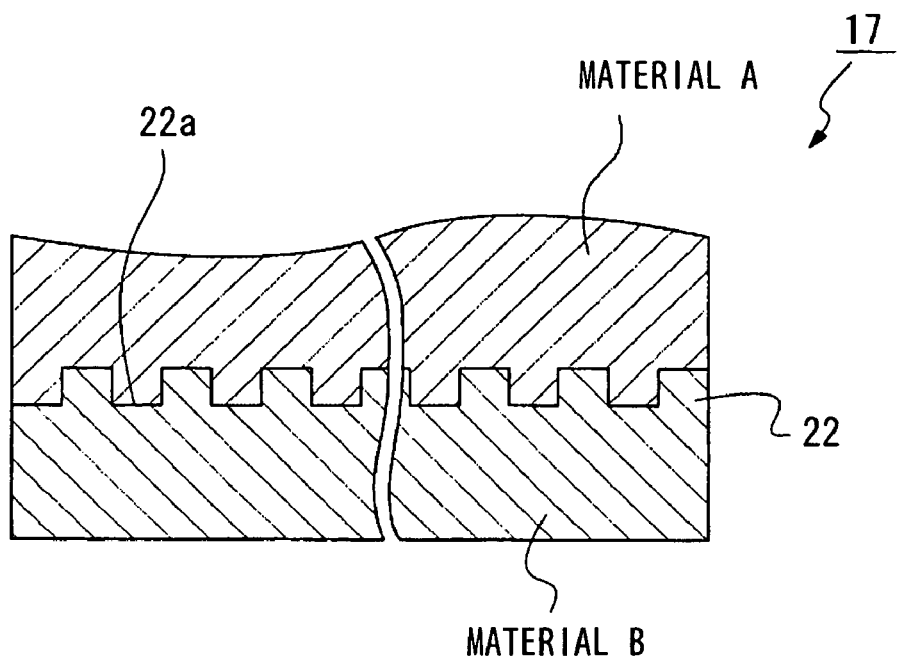
FIG. 3 is an enlarged sectional view showing an exemplary structure of a first diffraction section of a diffraction element.
Figure 4:
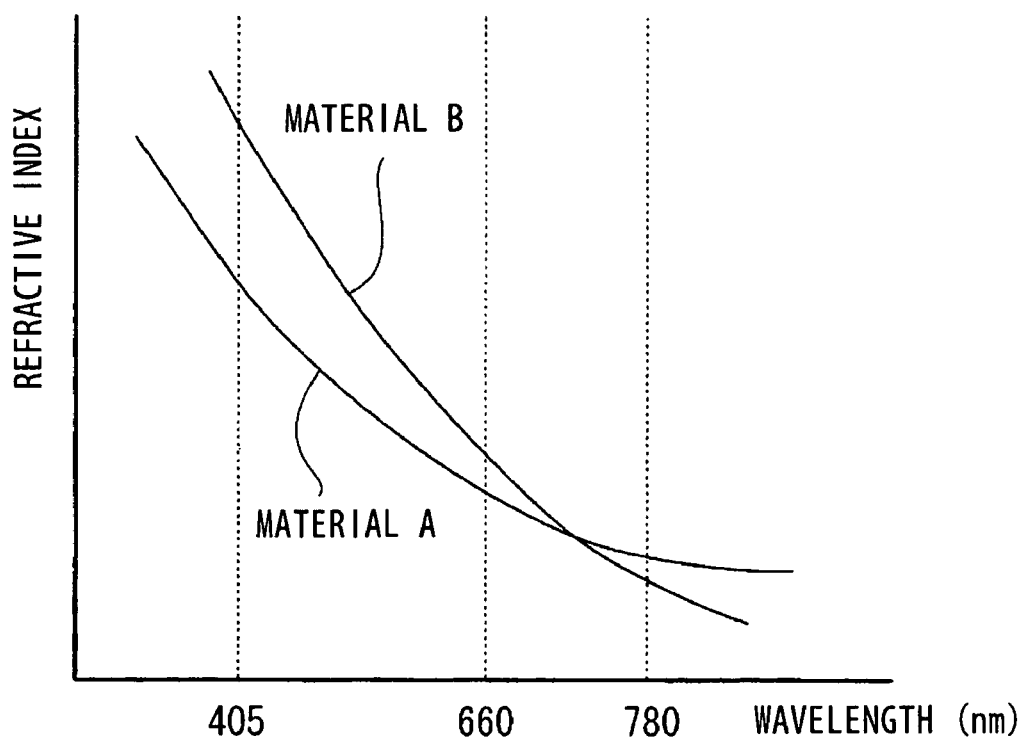
FIG. 4 is a graph showing exemplary materials used for forming the first diffraction section of the diffraction element, in conjunction with relations between wavelength and refractive index.
Figure 5:
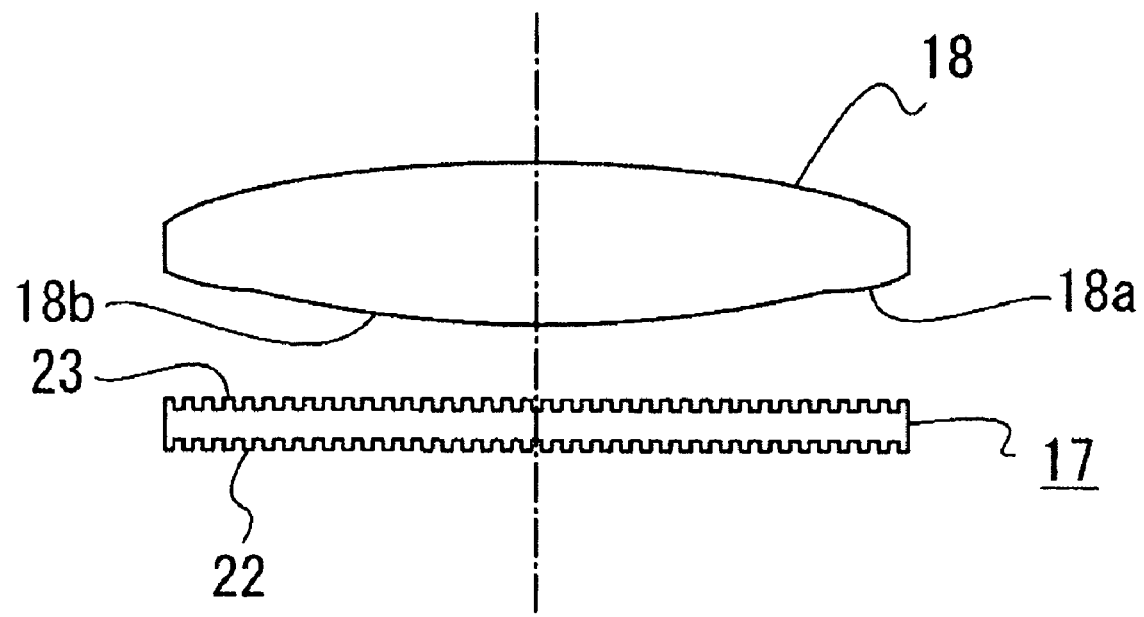
FIG. 5 is a conceptual drawing showing a configuration of the objective lens and the diffraction element adopted for the case where BD is used as the disc-formed recording medium corresponded to a wavelength of approximately 405 nm.

The first diffraction section 22 formed on the surface on the rise-up mirror 15 side is configured typically so as to allow the laser beam of approximately 405 nm to diffract thereon, but so as to allow the laser beams of approximately 660 nm and approximately 780 nm to substantially transmit therethrough. The first diffraction section 22 therefore functions as a control-purpose diffraction section controlling the degree of diffraction depending on wavelength of the incident laser beam. One possible configuration may be, typically as shown in FIG. 3, such as bonding two materials A and B, differed in the dispersion, while placing in between the diffraction surface having a blaze formed thereon. As the material A and the material B, as shown in FIG. 4, those being not much differed from each other in the refractive index within the range from approximately 660 nm to approximately 780 nm, but showing a large difference at around 405 nm.

Another possible configuration of the first diffraction section 22 may be such as forming a multi-layered diffraction surface 22a by stacking a plurality of films differed in the refractive index, so as to allow the laser beam of approximately 405 nm to diffract thereon, and so as to allow the laser beams of approximately 660 nm and approximately 780 nm to substantially transmit therethrough.

The second diffraction section 23 of the diffraction element 17 is configured also so as to allow all of the laser beams of approximately 405 nm, approximately 660 nm and approximately 780 nm to diffract thereon.

The objective lens 18 has a function of condensing the incident laser beam onto the recording surface of the disc-formed recording medium 100. The outer circumferential portion of the objective lens 18 is formed as a concentric ring zone 18a for adjusting the numerical aperture, and the concentric ring zone 18a is configured to correspond to the laser beam of approximately 405 nm. In other words, of the objective lens 18, a portion 18b inside the concentric ring zone 18a is adjusted to have a numerical aperture of approximately 0.65 corresponded to the laser beams of approximately 660 nm and of approximately 780 nm, and a combined portion of the concentric ring zone 18a and the portion 18b is adjusted to have a numerical aperture of approximately 0.85 corresponded to the laser beam of approximately 405 nm.

The conversion lens 19 has a function of converting optical magnifications of the laser beams emitted from the first light source 9 and the second light source 10 on the return path.

The optical axis synthesizing element 20 has a function of synthesizing the optical axes of the laser beams emitted from the first light source 9 and the second light source 10, and of condensing the individual laser beams onto the light-receiving element 21.

In thus-configured optical pickup 6, when the laser beam of approximately 660 nm or approximately 780 nm is emitted from the first light-emitting element 9a or from the second light-emitting element 9b of the first light source 9, the laser beam is converted in the optical magnification thereof on the forward path by the coupling lens 11, and allowed to enter the optical path synthesizing element 12. The laser beam incident on the optical path synthesizing element 12 is reflected on the mirror surface 12a, then allowed to transmit through the splitting surface 13a of the beam splitter 13, converted to parallel flux of light by the collimator lens 14, reflected on the rise-up mirror 15, and allowed to enter the quarter wavelength plate 16. The laser beam incident on the quarter wavelength plate 16 produces a retardation of $\pi/2$, converted from linear polarization (P polarization) to circular polarization, and allowed to enter the diffraction element 17. The laser beam incident on the diffraction element 17 is allowed to substantially transmit through the first diffraction section 22, diffracted by the second diffraction section 23, allowed to enter the portion 18b of the objective lens 18, and condensed on the recording surface of the DVD 100a or the CD 100b set on the disc table 3.

Figure 6:
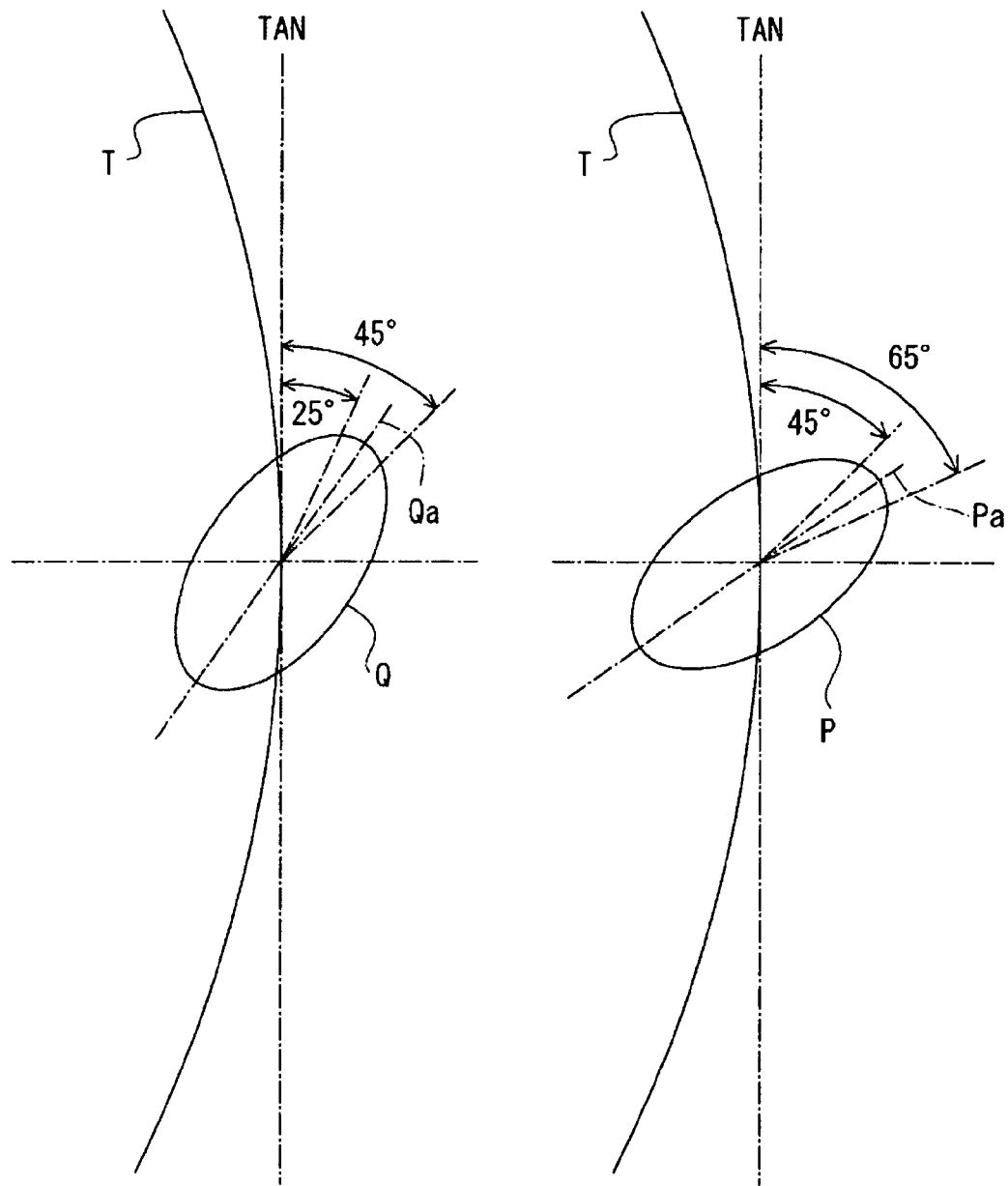
FIG. 6 is a conceptual drawing showing an exemplary orientation of a beam spot formed on a recording track.

The individual light-emitting surfaces of the first light-emitting element 9a and the second light-emitting element 9b herein are disposed so as to incline the long axes of the emitted laser beams 45° to 65° away from the recording surface of the disc-formed recording medium 100 as described in the above, so that in the state of condensation of the laser beam onto the recording surface of the DVD 100a or the CD 100b, as shown in FIG. 6, an elliptic beam spot P formed on the recording surface has the long axis Pa thereof inclined 45° to 65° away from the direction of tangent on the recording track T, or the tangential direction (TAN).

In general in optical pickups, a smaller beam spot in the tangential direction is more advantageous in reading signals to be reproduced from the pits because the amount of jitter can be reduced, and a smaller beam spot in the radial direction (direction of radius of the disc-formed recording medium) is more advantageous in reading a wobble signal from the groove. It is therefore preferable for the optical pickup to set the orientation of the beam spot of the laser beam, so as to successfully ensure a desirable performance of reading signals to be reproduced and a desirable performance of reading the wobble signal, so that an optimum value for ensuring both performances is determined taking track pitch and so forth of the individual disc-formed recording media into consideration.

In order to ensure both performances, a direction of the long axis of the beam spot inclined 45° to 65° away from the tangential direction is preferable for DVD, and a direction of the long axis of the beam spot inclined 25° to 45° away from the tangential direction is preferable for BD and AOD. While the direction of the long axis is not specifically limited as for CD, a preferable range is similar to that for DVD.

The laser beam condensed on the DVD 100a or the CD 100b is reflected on the recording surface to produce a return beam, and is allowed to pass again through the objective lens 18 and the diffraction element 17 and to enter the quarter wavelength plate 16. The laser beam incident on the quarter wavelength plate 16 produces a retardation of $\pi/2$, being converted from circular polarization into linear polarization (S polarization), and is allowed to enter the beam splitter 13 via the rise-up mirror 15 and the collimator lens 14. The return beam incident on the beam splitter 13 is reflected on the splitting surface 13a of the beam splitter 13, converted in the optical magnification thereof on the return path by the conversion lens 19, and is allowed to enter the light-receiving element 21 via the optical axis synthesizing element 20. The laser beam incident on the light-receiving element 21 is then subjected to photo-electric conversion, so as to effect recording or reproduction to or from the DVD 100a or the CD 100b.

On the other hand, if the laser beam of approximately 405 nm is emitted from the third light-emitting element 10a of the second light source 10, the laser beams is allowed to enter the optical path synthesizing element 12. The laser beam incident on the optical path synthesizing element 12 is allowed to transmit through the mirror surface 12a, then allowed to transmit through the splitting surface 13a of the beam splitter 13 and converted into parallel flux of light by the collimator lens 14, reflected on the rise-up mirror 15, and allowed to enter the quarter wavelength plate 16. The laser beam incident on the quarter wavelength plate 16 produces a retardation of $\pi/2$, converted from linear polarization (P polarization) into circular polarization, and is allowed to enter the diffraction element 17. The laser beam incident on the diffraction element 17 is diffracted by the diffraction section 22 and the second diffraction section 23, allowed to enter the concentric ring zone 18a of the objective lens 18, and condensed onto the recording surface of the BD 100c set on the disc table 3.

The light-emitting surface of the third light-emitting element 10a herein is disposed so as to incline the long axis of the laser beam emitted therefrom 25° to 45° away from the recording surface of the disc-formed recording medium 100 as described in the above, so that in the state of condensation of the laser beam onto the recording surface of the BD 100c, as shown in FIG. 6, an elliptic beam spot Q formed on the recording surface has the long axis Qa thereof inclined 25° to 45° away from the direction of tangent on the recording track T, or the tangential direction (TAN).

The laser beam condensed onto the recording surface of the BD 100c is reflected on the recording surface to produce a return beam, and is allowed to pass again through the objective lens 18 and the diffraction element 17 and to enter the quarter wavelength plate 16. The laser beam incident on the quarter wavelength plate 16 produces a retardation of $\pi/2$, being converted from circular polarization into linear polarization (S polarization), and is allowed to enter the beam splitter 13 via the rise-up mirror 15 and the collimator lens 14. The return beam incident on the beam splitter 13 is reflected on the splitting surface 13a of the beam splitter 13, converted in the optical magnification thereof on the return path by the conversion lens 19, and is allowed to enter the light-receiving element 21 via the optical axis synthesizing element 20. The laser beam incident on the light-receiving element 21 is then subjected to photo-electric conversion, so as to effect recording or reproduction to or from the BD 100c.

The foregoing paragraphs have described an exemplary case where the laser beam of approximately 405 nm is diffracted by the first diffraction section 22 of the diffraction element 17 and the laser beams of approximately 660 nm and approximately 780 nm are allowed to substantially transmit therethrough, but conversely, it is also allowable to adopt a configuration in which the laser beams of approximately 660 nm and approximately 780 nm are diffracted by the first diffraction section 22 of the diffraction element 17, the laser beam of approximately 405 nm is allowed to substantially transmit therethrough, the laser beams of approximately 660 nm and approximately 780 nm are allowed to enter the portion 18b of the objective lens 18, and the laser beam of approximately 405 nm is allowed to enter the concentric ring zone 18a of the objective lens 18.

Figure 7:
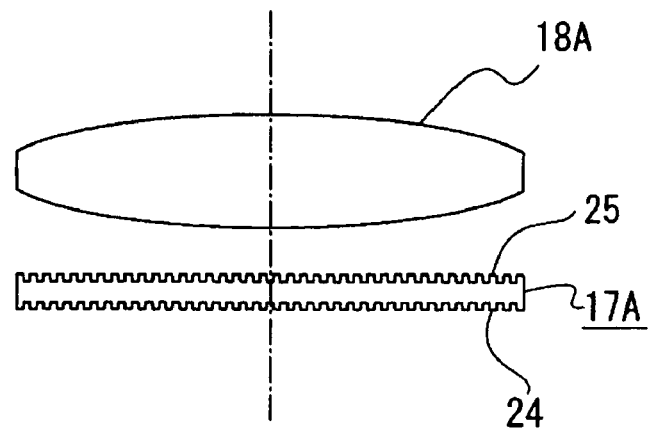
FIG. 7 is a conceptual drawing showing a configuration of an objective lens and a diffraction element adopted for a case where AOD is used as the disc-formed recording medium corresponded to a wavelength of approximately 405 nm.
Figure 8:
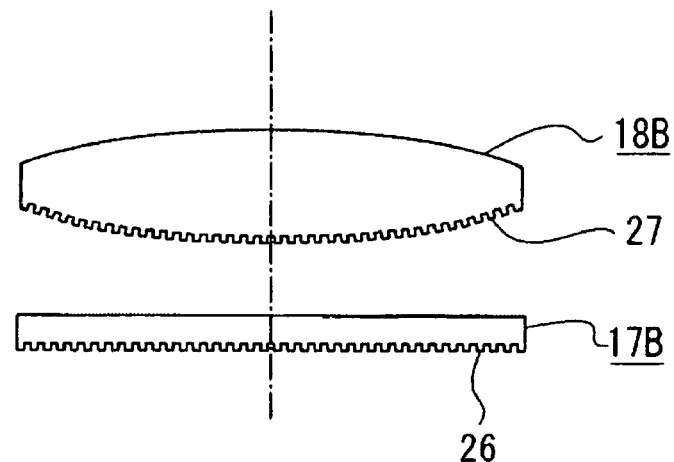
FIG. 8 is a conceptual drawing showing another configuration of the objective lens and the diffraction element adopted for the case where AOD is used as the disc-formed recording medium corresponded to a wavelength of approximately 405 nm.

The foregoing paragraphs have described an exemplary case of using the BD 100c as the disc-formed recording medium 100 allowing thereon recording and reproduction of information signals using the laser beam of approximately 405 nm, whereas a configuration described in the next is adopted for the case where the AOD 100d is used as the disc-formed recording medium 100 allowing thereon recording and reproduction of information signals using the laser beam of approximately 405 nm (see FIG. 7 and FIG. 8).

It is, however, to be understood that the case using the AOD 100d differs from the case using the BD 100c, only in the configuration of the diffraction element and the objective lens, so that only aspects different from those in the case of BD 100c will be detailed, allowing omission of explanation on any other aspects.

The diffraction element 17A has a first diffraction section 24 and a second diffraction section 25 respectively formed on both surfaces thereof (see FIG. 7). The configuration of the diffraction element 17A is same as the configuration of the above-described diffraction element 17.

The first diffraction section 24 formed on the rise-up mirror 15 side is configured typically so as to diffract thereon the laser beam of approximately 405 nm, but so as to allow the laser beams of approximately 660 nm and approximately 780 nm to substantially transmit therethrough. The first diffraction section 24 therefore functions as a control-purpose diffraction section controlling degree of diffraction depending on wavelength of the incident laser beam.

The second diffraction section 25 is configured so as to diffract all laser beams of approximately 405 nm, approximately 660 nm and approximately 780 nm.

The objective lens 18A has no concentric ring zone formed thereon, unlike the above-described objective lens 18, with the numerical aperture thereof adjusted to approximately 0.65.

In the configuration as described in the above, if the laser beam of approximately 660 nm or approximately 780 nm is emitted from the first light-emitting element 9a or the second light-emitting element 9b of the first light source 9, the laser beam is allowed to substantially transmit through the first diffraction section 24 of the diffraction element 17A, diffracted by the second diffraction section 25 and allowed to enter the objective lens 18A, and condensed onto the recording surface of the DVD 100a or the CD 100b set on the disc table 3, so as to effect recording or reproduction of information signals to or from the DVD 100a or the CD 100b.

The individual light-emitting surfaces of the first light-emitting element 9a and the second light-emitting element 9b herein are disposed so as to incline the long axes of the laser beams emitted therefrom 45° to 65° away from the recording surface of the disc-formed recording medium 100 as described in the above, so that in the state of condensation of the laser beam onto the recording surface of the DVD 100a or the CD 100b, as shown in FIG. 6, an elliptic beam spot P formed on the recording surface has the long axis Pa thereof inclined 45° to 65° away from the direction of tangent on the recording track T, or the tangential direction (TAN).

On the other hand, when the laser beam of approximately 405 nm is emitted from the third light-emitting element 10a of the second light source 10, the laser beam is diffracted by the first diffraction section 24 and the second diffraction section 25 of the diffraction element 17A, allowed to enter the objective lens 18A, condensed onto the recording surface of the AOD 100d set on the disc table 3, so as to effect recording or reproduction of information signals to or from the AOD 100d.

The light-emitting surface of the third light-emitting element 10a herein is disposed so as to incline the long axis of the laser beam emitted therefrom 25° to 45° away from the recording surface of the disc-formed recording medium 100 as described in the above, so that in the state of condensation of the laser beam onto the recording surface of the AOD 100d, as shown in FIG. 6, an elliptic beam spot Q formed on the recording surface has the long axis Qa thereof inclined 25° to 45° away from the direction of tangent on the recording track T, or the tangential direction (TAN).

For the case of using the AOD 100d, it is also allowable to adopt a configuration described in the next (see FIG. 8).

The diffraction element 17B has the first diffraction section 26 only on one surface thereof. The first diffraction section 26 is configured typically so as to diffract the laser beam of approximately 405 nm, but so as to allow the laser beams of approximately 660 nm and approximately 780 nm to substantially transmit therethrough. The first diffraction section 26 therefore functions as a control-purpose diffraction section controlling degree of diffraction depending on wavelength of the incident laser beam. A configuration of the first diffraction section 26 may be similar to the configuration of the first diffraction section 22 of the above-described diffraction element 17.

The objective lens 18B has no concentric ring zone formed thereon, unlike the above-described objective lens 18, and has the numerical aperture thereof adjusted to approximately 0.65. The objective lens 18B has a second diffraction section 27 formed on the surface opposing to the diffraction element 17B. The second diffraction section 27 is configured so as to diffract all laser beams of approximately 405 nm, approximately 660 nm and approximately 780 nm.

In the configuration as described in the above, if the laser beam of approximately 660 nm or approximately 780 nm is emitted from the first light-emitting element 9a or the second light-emitting element 9b of the first light source 9, the laser beam is allowed to substantially transmit through the first diffraction section 26 of the diffraction element 17B, allowed to enter the objective lens 18B and diffracted by the second diffraction section 27, and condensed onto the recording surface of the DVD 100a or the CD 100b set on the disc table 3, so as to effect recording or reproduction of information signals to or from the DVD 100a or the CD 100b.

The individual light-emitting surfaces of the first light-emitting element 9a and the second light-emitting element 9b herein are disposed so as to incline the long axes of the laser beams emitted therefrom 45° to 65° away from the recording surface of the disc-formed recording medium 100 as described in the above, so that in the state of condensation of the laser beam onto the recording surface of the DVD 100a or the CD 100b, as shown in FIG. 6, an elliptic beam spot P formed on the recording surface has the long axis Pa thereof inclined 45° to 65° away from the direction of tangent on the recording track T, or the tangential direction (TAN).

On the other hand, when the laser beam of approximately 405 nm is emitted from the third light-emitting element 10a of the second light source 10, the laser beam is diffracted by the first diffraction section 26 of the diffraction element 17B and the second diffraction section 27 of the of the objective lens 18B, and condensed onto the recording surface of the AOD 100d set on the disc table 3, so as to effect recording or reproduction of information signals to or from the AOD 100d.

The light-emitting surface of the third light-emitting element 10a herein is disposed so as to incline the long axis of the laser beam emitted therefrom 25° to 45° away from the recording surface of the disc-formed recording medium 100 as described in the above, so that in the state of condensation of the laser beam onto the recording surface of the AOD 100d, as shown in FIG. 6, an elliptic beam spot Q formed on the recording surface has the long axis Qa thereof inclined 25° to 45° away from the direction of tangent on the recording track T, or the tangential direction (TAN).

Also for the case of the AOD 100d, similarly to the case of the BD 100c, it is also allowable to adopt a configuration in which the laser beams of approximately 660 nm and approximately 780 nm are diffracted by the first diffraction section 24 or the first diffraction section 26 of the diffraction element 17A or the diffraction element 17B, and the laser beam of approximately 405 nm is allowed to substantially transmit therethrough.

Figure 9:
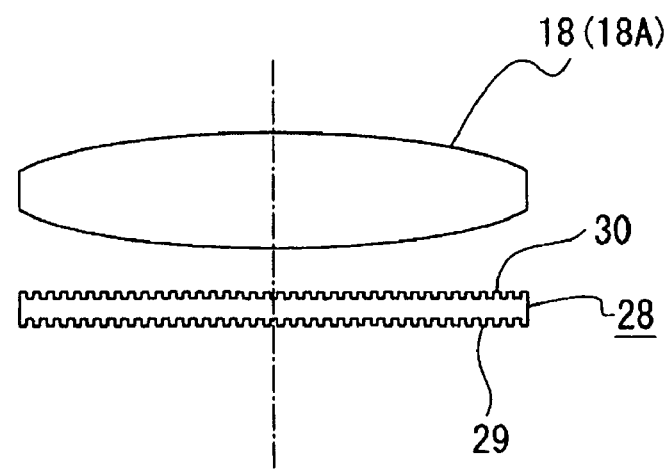
FIG. 9 is a conceptual drawing showing a configuration causing diffraction making use of a polarization hologram.

While the foregoing paragraphs have described the exemplary case where the diffraction sections were formed on the diffraction elements 17, 17A, 17B and on the objective lens 18B so as to diffract the laser beam, it is also allowable to adopt a configuration in which the laser beam is diffracted using a polarization hologram as described in the next (see FIG. 9).

It is to be understood that the configuration causing diffraction of the laser beam using a polarization hologram differs from the above-described configuration causing diffraction of the laser using the diffraction elements and the objective lens, only in that the polarization hologram is used in place of the diffraction elements, so that paragraphs below will detail only aspects different from those in the configuration causing diffraction of laser beam using the diffraction elements and the objective lens, allowing omission of explanation on any other aspects.

For the case of diffracting the laser beam using a polarization hologram, the disc-formed recording medium 100 allowing thereon recording and reproduction of information signals using the laser beam of approximately 405 nm may be either of the BD 100c and the AOD 100d.

The polarization hologram 28 has a first diffraction section 29 and a second diffraction section 30 respectively formed on both surfaces thereof.

A first diffraction section 29 formed on the surface on the rise-up mirror 15 side is configured typically so as to diffract P-polarized light, but so as to allow S-polarized light to transmit therethrough, and the second diffraction section 30 is configured typically so as to diffract S-polarized light but so as to allow P-polarized light to transmit therethrough. The first diffraction section 29 and the second diffraction section 30 function as control-purpose diffraction sections diffracting the incident laser beam depending on the direction of polarization.

As the objective lens, the objective lens 18 is used for the case where the BD 100c is used as the disc-formed recording medium 100 allowing thereon recording and reproduction of information signals using the laser beam of 405 nm, and the objective lens 18A is used for the case where the AOD 100d is used.

It is to be noted that the quarter wavelength plate 16 is not used for the case where the laser beam is diffracted using the polarization hologram 28, because the configuration is such as allowing linear polarized light to condense on the recording surface of the disc-formed recording medium 100.

In the configuration as described in the above, the laser beam of approximately 660 nm or approximately 780 nm emitted from the first light-emitting element 9a or the second light-emitting element 9b of the first light source 9 is typically S-polarized light, wherein the emitted S-polarized light entered the polarization hologram 28 is diffracted only by the second diffraction section 30. The diffracted S-polarized light is condensed on the recording surface of the DVD 100a or the CD 100b set on the disc table 3, by the objective lens 18 or the objective lens 18A, so as to allow recording or reproduction of information signals to or from the DVD 100a or the CD 100b.

Figure 10:
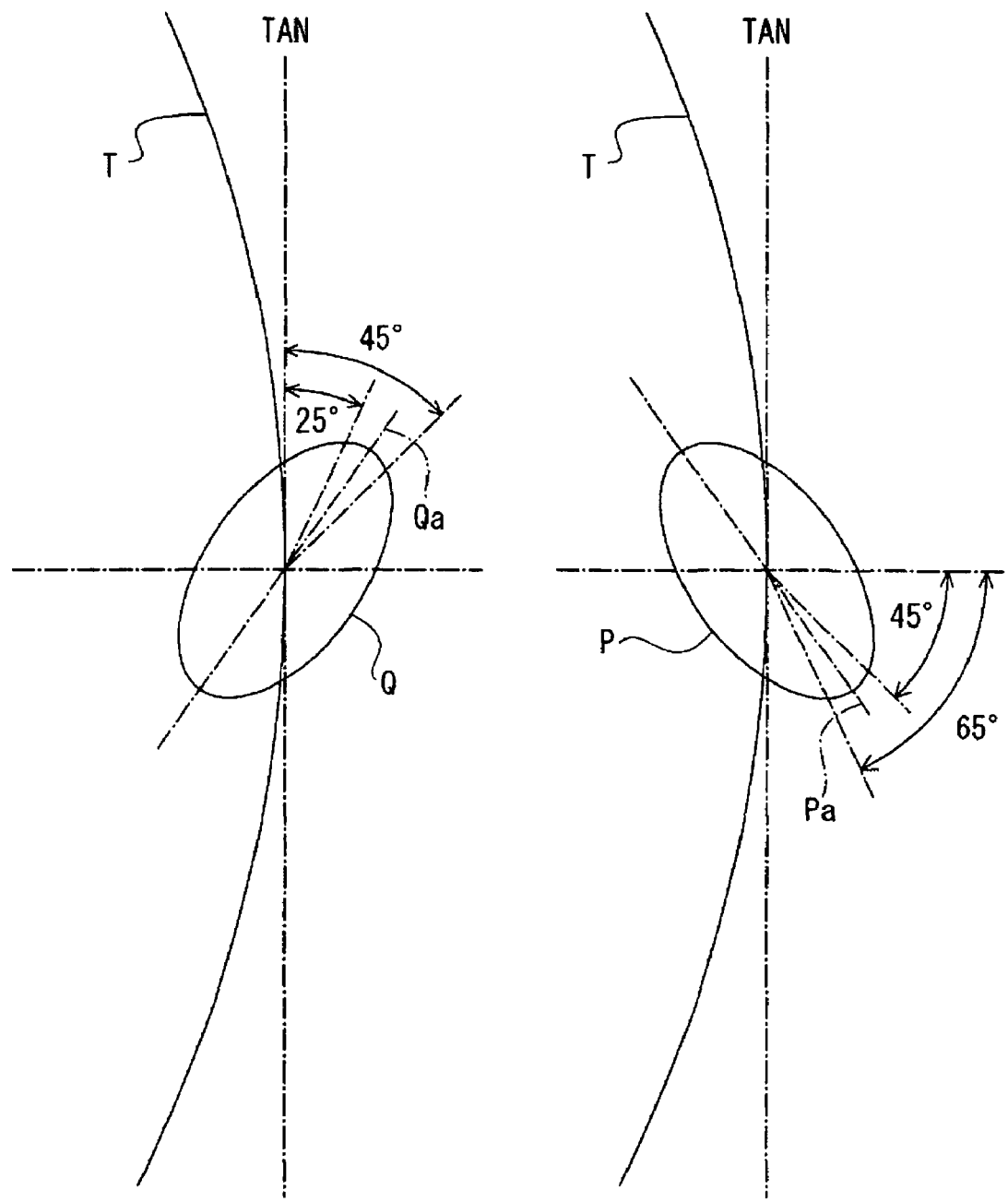
FIG. 10 is a conceptual drawing showing another exemplary orientation of the beam spot formed on the recording track.

The individual light-emitting surfaces of the first light-emitting element 9a and the second light-emitting element 9b herein are disposed so as to incline the long axes of the laser beams emitted therefrom 45° to 65° away from the recording surface of the disc-formed recording medium 100 as described in the above, so that in the state of condensation of the laser beam onto the recording surface of the DVD 100a or the CD 100b, as shown in FIG. 10, an elliptic beam spot P formed on the recording surface has the long axis Pa thereof inclined 45° to 65° away from the direction of tangent on the recording track T, or the tangential direction (TAN).

On the other hand, the laser beam of approximately 405 nm emitted from the first light-emitting element 10a is typically P-polarized light, wherein the emitted P-polarized light entered the polarization hologram 28 is diffracted only by the first diffraction section 29. The diffracted P-polarized light is condensed on the recording surface of the BD 100c or the AOD 100d set on the disc table 3, by the objective lens 18 or the objective lens 18A, so as to allow recording or reproduction of information signals to or from the BD 100c or the AOD 100d.

The light-emitting surface of the third light-emitting element 10a herein is disposed so as to incline the long axis of the laser beam emitted therefrom 25° to 45° away from the recording surface of the disc-formed recording medium 100 as described in the above, so that in the state of condensation of the laser beam onto the recording surface of the BD 100c or the AOD 100d, as shown in FIG. 10, an elliptic beam spot Q formed on the recording surface has the long axis Qa thereof inclined 25° to 45° away from the direction of tangent on the recording track T, or the tangential direction (TAN).

It is to be noted that, for the case where the polarization hologram 28 is used, linear polarized lights having the directions of polarization normal to each other are allowed to enter the polarization hologram 28 as described in the above, wherein it is also allowable to make agreement between the directions of polarization and the orientations of the beam spots P, Q. If the directions of polarization and the orientations of the beam spots P, Q are respectively brought into agreement, as shown in FIG. 10, the orientations of the individual long axes of the beam spots P, Q formed on the recording surface of the disc-formed recording medium 100 cross normal to each other.

While the foregoing paragraphs have described the exemplary case where the directions of polarization of the laser beams of approximately 660 nm and approximately 780 nm cross normal to that of the laser beam of approximately 405 nm, it is also allowable that the direction of polarization of the laser beam of approximately 780 nm crosses normal to those of the laser beams of approximately 405 nm and approximately 660 nm.

As has been described in the above, in the disc drive apparatus 1, the long axes Pa of the beam spots P of the laser beams having wavelengths of approximately 660 nm and approximately 780 nm are aligned in the direction 45° to 65° away from the tangential direction of the disc-formed recording medium 100, and the long axis Qa of the beam spot Q of the laser beam having a wavelength of approximately 405 nm is aligned in the direction 25° to 45° away from the tangential direction of the disc-formed recording medium 100, so that, in a configuration allowing recording and reproduction of information signals to or from three types of disc-formed recording media 100 using any one of the objective lens 18, the objective lens 18A and the objective lens 18B, so that it is made possible to ensure desirable performances of reading signals to be reproduced and wobble signals with respect to any of three types of disc-formed recording media 100, and to obtain desired characteristics of the optical pickup 6.

Because there is no need of using any expensive optical elements such as anamorphic prism, it is made possible to ensure desirable performances of reading signals to be reproduced and wobble signals, without causing increase in costs for manufacturing the optical pickup 6 and the disc drive apparatus 1.

While the foregoing paragraphs have described the exemplary case where the long axes Pa of the beam spots P of the laser beams having wavelengths of approximately 660 nm and approximately 780 nm were aligned in the direction 45° to 65° away from the tangential direction of the disc-formed recording medium 100, and the long axis Qa of the beam spot Q of the laser beam having a wavelength of approximately 405 nm is aligned in the direction 25° to 45° away from the tangential direction of the disc-formed recording medium 100, there is no special limitation on the direction of long axis for the CD 100b as described in the above, so that it is also allowable to align the long axis of the beam spot of the laser beam having a wavelength of approximately 780 nm in a direction other than the direction 45° to 65° away from the tangential direction of the disc-formed recording medium 100.

The specific geometries and structure of the individual components shown in the best modes described in the above are none other than a tiny portion of examples of embodying the present invention, so that the technical scope of the present invention should not limitedly be interpreted based on these examples.

INDUSTRIAL APPLICABILITY

The optical pickup of the present invention has a moving base which moves itself in the direction of radius of a disc-formed recording medium set on a disc table; an objective lens driver disposed on the moving base; a plurality of light-emitting elements differed in type, each of which emits, towards a plurality of disc-formed recording media differed in type, laser beam of a wavelength of approximately 405 nm, approximately 660 nm or approximately 780 nm corresponded to each of the disc-formed media; an objective lens which condenses each laser beam onto a recording surface of the disc-formed recording medium; and a light-receiving element which receives the laser beam emitted from the light-emitting elements, and is characterized to be configured to allow the objective lens to condenses the laser beam onto the recording surface of the disc-formed recording medium to thereby form an elliptic beam spot; so that the long axis of a beam spot of the laser beam having a wavelength of approximately 660 nm is aligned in a direction 45° to 65° away from the tangential direction of the disc-formed recording medium; and so that the long axis of a beam spot of the laser beam having a wavelength of approximately 405 nm is aligned in a direction 25° to 45° away from the tangential direction of the disc-formed recording medium.

As a consequence, in the configuration allowing recording and reproduction of information signals to or from a plurality of types of disc-formed recording media using a single objective lens, it is made possible to ensure desirable performances of reading signals to be reproduced and wobble signals with respect to any of the plurality of types of disc-formed recording media, and to obtain desired characteristics of the optical pickup.

Because there is no need of using any expensive optical elements such as anamorphic prism, it is made possible to ensure desirable performances of reading signals to be reproduced and wobble signals, without causing increase in costs for manufacturing the optical pickup.

According to the invention described in claim 2, the long axis of the beam spot of the laser beam having a wavelength of approximately 780 nm is aligned in the direction 45° to 65° away from the tangential direction of the disc-formed recording medium, so that it is made possible to ensure desirable performances of reading signals to be reproduced and wobble signals with respect to the disc-formed recording medium using the laser beam having a wavelength of approximately 780 nm, and to obtain desired characteristics of the optical pickup.

The disc drive apparatus of the present invention is a disc drive apparatus having a disc table on which a plurality of disc-formed recording medium differed in type is independently set and rotated, having a moving base which moves itself in the direction of radius of a disc-formed recording medium set on a disc table; an objective lens driver disposed on the moving base; a plurality of light-emitting elements differed in type, each of which emits, towards a plurality of disc-formed recording media differed in type, laser beam of a wavelength of approximately 405 nm, approximately 660 nm or approximately 780 nm corresponded to each of the disc-formed media; an objective lens which condenses each laser beam onto a recording surface of the disc-formed recording medium; and a light-receiving element which receives the laser beam emitted from the light-emitting elements, and is characterized to be configured so as to allow the objective lens to condense the laser beam onto the recording surface of the disc-formed recording medium to thereby form an elliptic beam spot; so that the long axis of a beam spot of the laser beam having a wavelength of approximately 660 nm is aligned in a direction 45° to 65° away from the tangential direction of the disc-formed recording medium; and so that the long axis of a beam spot of the laser beam having a wavelength of approximately 405 nm is aligned in a direction 25° to 45° away from the tangential direction of the disc-formed recording medium.

As a consequence, in the configuration allowing recording and reproduction of information signals to or from a plurality of types of disc-formed recording media using a single objective lens, it is made possible to ensure desirable performances of reading signals to be reproduced and wobble signals with respect to any of the plurality of types of disc-formed recording media, and to obtain desired characteristics of the optical pickup.

Because there is no need of using any expensive optical elements such as anamorphic prism, it is made possible to ensure desirable performances of reading signals to be reproduced and wobble signals, without causing increase in costs for manufacturing the optical pickup.

According to the invention described in Claim 4, the long axis of the beam spot of the laser beam having a wavelength of approximately 780 nm is aligned in the direction 45° to 65° away from the tangential direction of the disc-formed recording medium, so that it is made possible to ensure desirable performances of reading signals to be reproduced and wobble signals with respect to the disc-formed recording medium using the laser beam having a wavelength of approximately 780 nm, and to obtain desired characteristics of the optical pickup.

The invention claimed is:

1. An optical pickup comprising:
   a moving base which moves itself in the direction of radius of a disc-formed recording medium set on a disc table;
   an objective lens driver disposed on the moving base;
   a plurality of light-emitting elements differed in type, each of which emits, towards a plurality of disc-formed recording media differed in type, laser beam of a wavelength of approximately 405 nm, approximately 660 nm and approximately 780 nm corresponded to each of the disc-formed media;
   an objective lens which condenses each laser beam onto a recording surface of said disc-formed recording medium; and
   a light-receiving element which receives the laser beam emitted from said light-emitting elements, and characterized in that:
   said objective lens condenses the laser beam onto the recording surface of the disc-formed recording medium to thereby form an elliptic beam spot;
   a long axis of a beam spot of said laser beam having a wavelength of approximately 660 nm is aligned in a direction more than 45° to less than 65° away from a tangential direction of the disc-formed recording medium; and
   a long axis of a beam spot of said laser beam having a wavelength of approximately 405 nm is aligned in a direction more than 25° to less than 45° away from the tangential direction of the disc-formed recording medium.

2. The optical pickup as claimed in claim 1, wherein a long axis of a beam spot of said laser beam having a wavelength of approximately 780 nm is aligned in a direction more than 45° to less than 65° away from the tangential direction of the disc-formed recording medium.

3. A disc drive apparatus having a disc table on which a plurality of disc-formed recording medium differed in type is independently set and rotated, comprising:
   a moving base which moves itself in the direction of radius of a disc-formed recording medium set on a disc table;
   an objective lens driver disposed on the moving base;
   a plurality of light-emitting elements differed in type, each of which emits, towards a plurality of disc-formed recording media differed in type, laser beam of a wavelength of approximately 405 nm, approximately 660 nm and approximately 780 nm corresponded to each of said disc-formed media;
   an objective lens which condenses each laser beam onto a recording surface of the disc-formed recording medium; and
   a light-receiving element which receives the laser beam emitted from said light-emitting elements, and characterized in that:
   said objective lens condenses the laser beam onto the recording surface of the disc-formed recording medium to thereby form an elliptic beam spot;
   a long axis of a beam spot of said laser beam having a wavelength of approximately 660 nm is aligned in a direction more than 45° to less than 65° away from a tangential direction of the disc-formed recording medium; and
   a long axis of a beam spot of said laser beam having a wavelength of approximately 405 nm is aligned in a direction more than 25° to less than 45° away from the tangential direction of the disc-formed recording medium.

4. The disc drive apparatus as claimed in claim 3, wherein a long axis of a beam spot of said laser beam having a wavelength of approximately 780 nm is aligned in a direction more than 45° to less than 65° away from the tangential direction of the disc-formed recording medium.

5. A method of picking up optical signals comprising:
moving a base in the direction of radius of a disc-formed recording medium set on a disc table;
disposing an objective lens driver on the moving base;
emitting from a plurality of light-emitting elements differed in type, towards a plurality of disc-formed recording media differed in type, laser beams of a wavelength of approximately 405 nm, approximately 660 nm and approximately 780 nm corresponded to each of the disc-formed media;
condensing through an objective lens each laser beam onto a recording surface of said disc-formed recording medium; and
receiving through a light-receiving element the laser beam emitted from said light-emitting elements, and characterized in that:
said objective lens condenses the laser beam onto the recording surface of the disc-formed recording medium to thereby form an elliptic beam spot;
a long axis of a beam spot of said laser beam having a wavelength of approximately 660 nm is aligned in a direction more than 45° to less than 65° away from a tangential direction of the disc-formed recording medium; and
a long axis of a beam spot of said laser beam having a wavelength of approximately 405 nm is aligned in a direction more than 25° to less than 45° away from the tangential direction of the disc-formed recording medium.

6. The disc drive apparatus as claimed in claim 5, wherein a long axis of a beam spot of said laser beam having a wavelength of approximately 780 nm is aligned in a direction more than 45° to less than 65° away from the tangential direction of the disc-formed recording medium.

* * * * *